(12) United States Patent
Koretz et al.

(10) Patent No.: US 10,316,278 B2
(45) Date of Patent: Jun. 11, 2019

(54) SYSTEMS AND METHODS FOR WINE PROCESSING

(71) Applicant: Wine Plum, Inc., Dania Beach, FL (US)

(72) Inventors: David Andrew Koretz, Miami, FL (US); Donald G. Hubbard, Jr., Hollywood, FL (US); Niculae Mustatea, Sunrise, FL (US); Michael Dumont, San Francisco, CA (US); Kyle Adams, Brisbane, CA (US)

(73) Assignee: Wine Plum, Inc., Dania Beach, FL (US)

( * ) Notice: Subject to any disclaimer, the term of this patent is extended or adjusted under 35 U.S.C. 154(b) by 0 days.

(21) Appl. No.: 15/625,469

(22) Filed: Jun. 16, 2017

(65) Prior Publication Data
US 2017/0349868 A1    Dec. 7, 2017

Related U.S. Application Data

(63) Continuation of application No. 14/826,111, filed on Aug. 13, 2015, now Pat. No. 9,708,575.
(Continued)

(51) Int. Cl.
*B01F 3/04* (2006.01)
*C12H 1/00* (2006.01)
(Continued)

(52) U.S. Cl.
CPC ............ *C12H 1/00* (2013.01); *A47J 31/4403* (2013.01); *B01F 3/04808* (2013.01); *B01F 15/00181* (2013.01); *B01F 15/06* (2013.01); *B67D 1/0004* (2013.01); *B67D 1/04* (2013.01); *B67D 1/0869* (2013.01); *B67D 1/0885* (2013.01); *B67D 1/1252* (2013.01); *C12H 1/14* (2013.01); *C12H 1/16* (2013.01); *G06F 3/0412* (2013.01);
(Continued)

(58) Field of Classification Search
CPC .... C12H 1/00; A47J 31/4403; B01F 3/04808; B01F 15/06; B01F 3/04; B67D 1/04
USPC .................................................. 222/82, 152
See application file for complete search history.

(56) References Cited

U.S. PATENT DOCUMENTS 276,804 A    5/1883    Green
695,235 A    3/1902    Riolet
(Continued)

FOREIGN PATENT DOCUMENTS

CN    2892716 Y    4/2007
CN    101754923 A    6/2010
(Continued)

OTHER PUBLICATIONS

"Gasket Handbook: A Technical Guide to Gasketing & Bolted Joints"; Lamons Gasket Company; Feb. 2012 (172 pages).
(Continued)

*Primary Examiner* — Robert A Hopkins
(74) *Attorney, Agent, or Firm* — Chamberlain, Hrdlicka, White, Williams & Aughtry

(57) ABSTRACT

Embodiments of the present disclosure are directed to extracting the liquid from a container (such as a bottle of wine) in varying amounts at a desired serving temperature while preserving the liquid for later consumption. Various embodiments may be built within an appliance so the consumer experience is fully automated. Embodiments may include a variety of wine preservation techniques including the use of inert gases that prevent the oxidation of wine.

18 Claims, 14 Drawing Sheets

Related U.S. Application Data

(60) Provisional application No. 62/093,356, filed on Dec. 17, 2014.

(51) Int. Cl.

| | | |
|---|---|---|
| *B67D 1/04* | (2006.01) | |
| *A47J 31/44* | (2006.01) | |
| *B01F 15/00* | (2006.01) | |
| *B01F 15/06* | (2006.01) | |
| *B67D 1/00* | (2006.01) | |
| *G06F 3/041* | (2006.01) | |
| *G06K 7/10* | (2006.01) | |
| *G06K 9/00* | (2006.01) | |
| *H04N 5/232* | (2006.01) | |
| *C12H 1/14* | (2006.01) | |
| *C12H 1/16* | (2006.01) | |
| *G06F 3/0488* | (2013.01) | |
| *B67D 1/08* | (2006.01) | |
| *B67D 1/12* | (2006.01) | |
| *B67D 1/07* | (2006.01) | |
| *B67D 3/00* | (2006.01) | |

(52) U.S. Cl.
CPC ....... *G06F 3/0488* (2013.01); *G06K 7/10821* (2013.01); *G06K 9/00362* (2013.01); *G06K 9/00677* (2013.01); *H04N 5/23222* (2013.01); *H04N 5/23293* (2013.01); *B01F 2015/062* (2013.01); *B67D 1/0437* (2013.01); *B67D 1/07* (2013.01); *B67D 1/0861* (2013.01); *B67D 1/0884* (2013.01); *B67D 1/0888* (2013.01); *B67D 1/0895* (2013.01); *B67D 3/0032* (2013.01); *B67D 2001/0481* (2013.01); *B67D 2210/00118* (2013.01); *H04N 5/23206* (2013.01)

(56) References Cited

U.S. PATENT DOCUMENTS

| | | |
|---|---|---|
| 718,163 A | 1/1903 | Sherrard |
| 1,041,699 A | 10/1912 | Thompson, Jr. |
| 1,938,484 A | 12/1933 | Clarin |
| 2,612,065 A | 9/1952 | Packer et al. |
| 3,174,650 A | 3/1965 | Bellato |
| 3,227,310 A | 1/1966 | Farandatos |
| 3,883,043 A | 5/1975 | Lane |
| 4,011,971 A | 3/1977 | Haydon |
| 4,308,975 A | 1/1982 | Bowen |
| 4,691,842 A | 9/1987 | Foures |
| 4,766,780 A | 8/1988 | Sechen |
| 4,984,711 A | 1/1991 | Ellis |
| 5,020,395 A | 6/1991 | Mackey |
| 5,086,675 A | 2/1992 | Leung et al. |
| 5,095,778 A | 3/1992 | Bocsi et al. |
| 5,372,054 A | 12/1994 | Federighi, Sr. |
| 5,404,922 A | 4/1995 | Sliter |
| 5,490,321 A | 2/1996 | Kaneko |
| 5,517,867 A | 5/1996 | Ely et al. |
| 5,724,869 A | 3/1998 | May |
| 5,802,863 A | 9/1998 | Cowans |
| 6,216,913 B1 | 4/2001 | Bilskie et al. |
| 6,321,620 B1 | 11/2001 | Fabbro |
| 6,557,459 B1 | 5/2003 | Phelps et al. |
| 6,658,859 B2 | 12/2003 | Phelps et al. |
| 6,913,167 B2 | 7/2005 | Phelps et al. |
| 7,234,375 B1 | 6/2007 | Wang Wu |
| 7,254,952 B2 | 8/2007 | Lilke |
| 7,596,956 B2 | 10/2009 | Lilke |
| 7,712,637 B2 | 5/2010 | Lambrecht |
| 7,815,865 B2 | 10/2010 | Hoffman et al. |
| 7,918,400 B2 | 4/2011 | Baltuch |
| 8,011,276 B2 | 9/2011 | Varme |
| 8,033,431 B2 | 10/2011 | Sommerfield et al. |
| 8,109,301 B1 | 2/2012 | Denise |
| 8,141,746 B2 | 3/2012 | Lambrecht |
| 8,225,959 B2 | 7/2012 | Lambrecht |
| 8,248,254 B2 | 8/2012 | Vogt et al. |
| 8,272,538 B2 | 9/2012 | Weinberg et al. |
| 8,326,354 B2 | 12/2012 | Ahn |
| 8,371,478 B2 | 2/2013 | Sommerfield et al. |
| 8,453,888 B2 | 6/2013 | Sommerfield et al. |
| 8,490,832 B2 | 7/2013 | Lambrecht |
| 8,556,136 B2 | 10/2013 | Huynh |
| 8,578,819 B2 | 11/2013 | Cheung |
| 8,640,919 B2 | 2/2014 | Lambrecht |
| 8,746,502 B2 | 6/2014 | Lambrecht |
| 8,910,829 B2 | 12/2014 | Lazaris et al. |
| 9,010,588 B2 | 4/2015 | Lambrecht |
| 9,016,502 B2 | 4/2015 | Hollars et al. |
| 9,016,517 B2 | 4/2015 | Craft |
| 9,181,021 B2 | 11/2015 | Manera |
| 9,637,367 B1 | 5/2017 | Arnold |
| 2003/0213814 A1 | 11/2003 | Phelps et al. |
| 2004/0118291 A1 | 6/2004 | Carhuff et al. |
| 2008/0054015 A1 | 3/2008 | Moezidis |
| 2008/0098854 A1 | 5/2008 | Goldstein |
| 2010/0005811 A1 | 1/2010 | Jaffe et al. |
| 2010/0155419 A1 | 6/2010 | Nishino |
| 2011/0204093 A1 | 8/2011 | Lee |
| 2011/0253746 A1 | 10/2011 | O'Keefe, Jr. |
| 2012/0080445 A1 | 4/2012 | Moezidis et al. |
| 2013/0129876 A1 | 5/2013 | Ye et al. |
| 2014/0097198 A1 | 4/2014 | Lazaris et al. |
| 2014/0103065 A1 | 4/2014 | Lambrecht et al. |
| 2014/0110431 A1 | 4/2014 | Lambrecht |
| 2014/0124530 A1 | 5/2014 | Craft |
| 2014/0224833 A1 | 8/2014 | Lambrecht |
| 2014/0252046 A1 | 9/2014 | Rider et al. |

FOREIGN PATENT DOCUMENTS

| | | |
|---|---|---|
| CN | 102871548 A | 1/2013 |
| CN | 203319683 U | 12/2013 |
| CN | 203578303 U | 5/2014 |
| EP | 2165967 A1 | 3/2010 |
| FR | 8910853 | 8/1989 |
| WO | 2005/058744 A2 | 6/2005 |
| WO | 2007/017234 A1 | 2/2007 |
| WO | 2009/000147 A1 | 12/2008 |
| WO | 2016/099625 A1 | 6/2016 |
| WO | 2016/099626 A1 | 6/2016 |

OTHER PUBLICATIONS

First Office Action issued in corresponding Chinese Application No. 201580069619.0, dated Nov. 14, 2018.
International Search Report and Written Opinion issued in corresponding Application No. PCT/US2018/036716, dated Oct. 16, 2018.
"Juicebox (container)" Wikipedia published Nov. 15, 2012 accessed at <https://en.wikipedia.org/w/index.php?title=Juicebox_(container)&oldid=523167246. 2 pages.

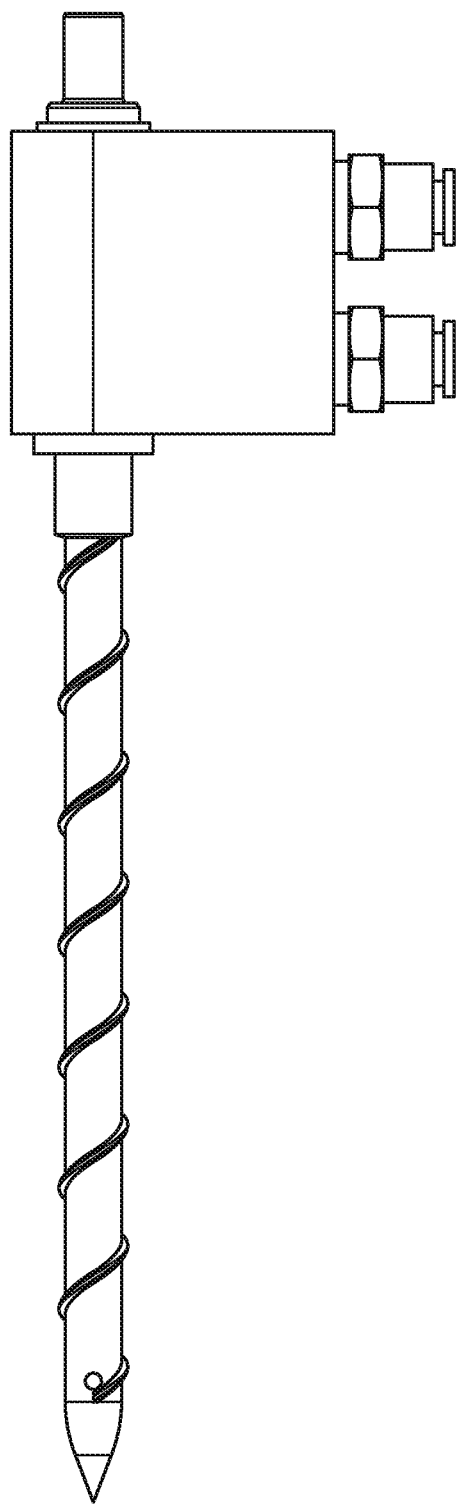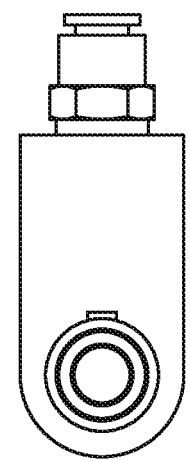
FIG. 2E
FIG. 2F

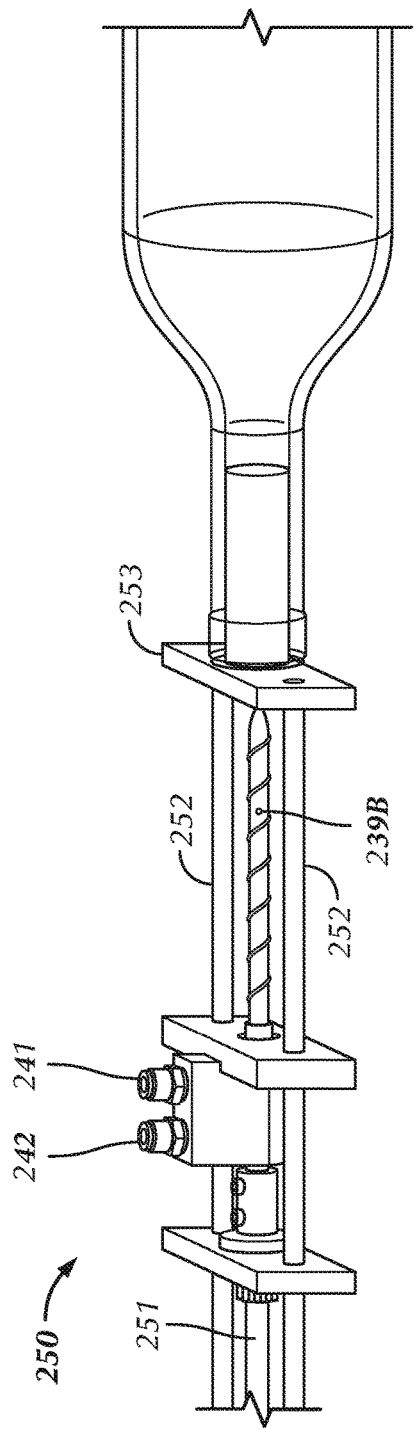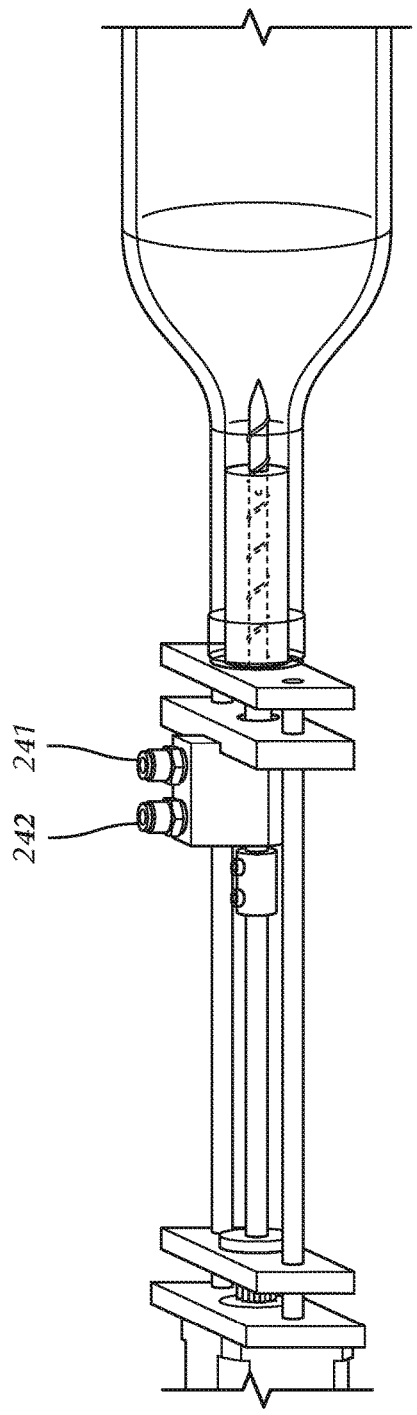
FIG. 2H
FIG. 2I

SYSTEMS AND METHODS FOR WINE PROCESSING

CROSS-REFERENCE TO RELATED APPLICATION

This application is a continuation, filed under 37 CFR 1.53(b), of U.S. Utility patent application Ser. No. 14/826,111 and, therefore, claims the benefit of the earlier filing date of the '111 application under 35 U.S.C. § 120. U.S. Utility patent application Ser. No. 14/826,111 claims priority to U.S. Provisional Patent Application No. 62/093,356, filed Dec. 17, 2014 and entitled "SYSTEMS AND METHODS FOR WINE PROCESSING," and is related to U.S. patent application Ser. No. 14/825,888, filed Aug. 13, 2015 and entitled "SYSTEMS AND METHODS FOR WINE PRESERVATION," the contents of which are hereby incorporated by reference.

BACKGROUND

Automatic espresso makers have transformed the consumer coffee experience. Instead of making a pot of coffee, consumers can now hit a button and a computer would grind the beans, heat the water, tamp it down, and electronically dispense the perfect cup of coffee. Most people just want a great cup of coffee in the morning, and a great glass of wine at night, yet there is no way to have a perfect wine by the glass experience.

One of the critical elements is serving temperature. Every wine has a proper serving temperature. Each varietal requires a different temperature to maximize both aromas and flavor. Maintaining wine at these serving temperatures is incredibly difficult with current technology. Each wine varietal requires a different temperature to maximize both aroma and flavor, and some people prefer to deviate from the recommended serving temperature for a given wine, preferring it either colder or warmer temperature than recommended.

Traditional home refrigerators are typically far too cold to be used to chill a wine to serving temperature, so they are not effective. The use of ice buckets also severely flawed because the wine begins too warm and ultimately gets too cold as ice is below 32 degrees. Moreover, the temperature of the wine within a bottle can vary wildly, with the temperature of the wine along the bottle (i.e., that is in close contact with the ice) may be far cooler than the wine in the center of the bottle.

Dedicated wine refrigerators have been introduced to chill different types of wine to different temperatures for long-term storage. These refrigerators are generally not, however, effective for cooling a single bottle of wine to serving temperature, as they typically chill all red wines to a single aging temperature and are not able to chill each varietal independently. Further, some wines actually need to be warmed after exiting the wine refrigerator to reach the proper serving temperature, and there are no systems that contain an integrated heating method to accomplish this. Still further, the moment the bottle is removed from the refrigerator it comes into contact with the ambient air and begins to warm to room temperature. As a result, these systems are not effective for the serving of wine.

Embodiments of the present disclosure overcome these and other issues and allow each individual bottle of wine to be brought to its perfect serving temperature and this serving temperature maintained.

Additionally, wine suffers from an incredible sensitivity to oxygen, which can turn expensive wine into worthless vinegar within days. Worse, the older the wine, the more sensitive it is to oxygen, putting the rarest and most expensive bottles the most at risk.

Some previous attempts to assist consumers, restaurants, and wineries in solving this problem include the use of vacuum pump-based systems, but such systems are known to have numerous issues ranging from their inability to create a true vacuum seal, to the speed at which the vacuum seal dissipates, to the claims that the vacuum process removes the much-desired aromas from the wine, actually making it worse.

Other conventional solutions have attempted to take advantage of several naturally occurring gases, known as "inert gases" that are known to have no effect on wine. Such gasses include Helium (He), Neon (Ne), Argon (Ar), Krypton (Kr), Xenon (Xe), and Radon (Rn). Argon is particularly suitable because it is heavier than oxygen and can therefore displace oxygen in a bottle. Nitrogen, and Nitrogen and Argon blends are also regularly used. These conventional systems are all inadequate at preservation because they function by having the user remove the cork, and then add argon afterwards to reduce oxidation. This is flawed, because once you begin oxidation it's impossible to stop. You can only temporarily slow it down.

Further, conventional systems using inert gasses do not possess any ability to warm the wine, which is limiting as discussed above. Conventional devices also suffer from a lack of automation requiring the user to manually identify the varietal, research the appropriate temperature for that varietal and manually set the temperature.

Still other conventional solutions have integrated an exposed needle mechanism with a regulator and argon to extract wine from an individual bottle. These solutions are limiting because they do not handle refrigeration. They also can only handle small argon canisters because the devices are hand-held, and require the user to hold the device and bottle in mid-air to pour. They are also suffer from a lack of an integrated bottle holder, potentially exposing users to dangerous needles and/or exploding glass bottles. Such devices typically also lack the ability to accommodate multiple bottles of wine, and to track or control the consumption of such bottles and offer recommendations and information regarding various wines via mobile electronic devices and social media. These and other issues are addressed by embodiments of the present disclosure.

SUMMARY

Embodiments of the present disclosure may be used to dispense and preserve liquids, such as wine. A system according to various aspects of the present disclosure includes: a needle comprising: a first end; a second end for piercing a closure of a bottle of liquid; a gas passage through the needle for supplying an inert gas to the bottle of liquid, the gas passage including a first aperture proximate to the first end for receiving the inert gas and a second aperture proximate to the second end for emitting the inert gas; and a liquid passage through the needle for dispensing the liquid from the bottle, the liquid passage including a first aperture proximate to the first end for dispensing the liquid and a second aperture proximate to the second end for receiving the liquid from the bottle.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

BRIEF DESCRIPTION OF DRAWINGS

FIGS. 2A-2L depict exemplary embodiments of systems for preserving and dispensing a liquid according to various aspects of the present disclosure.

DETAILED DESCRIPTION

Figure 1A:
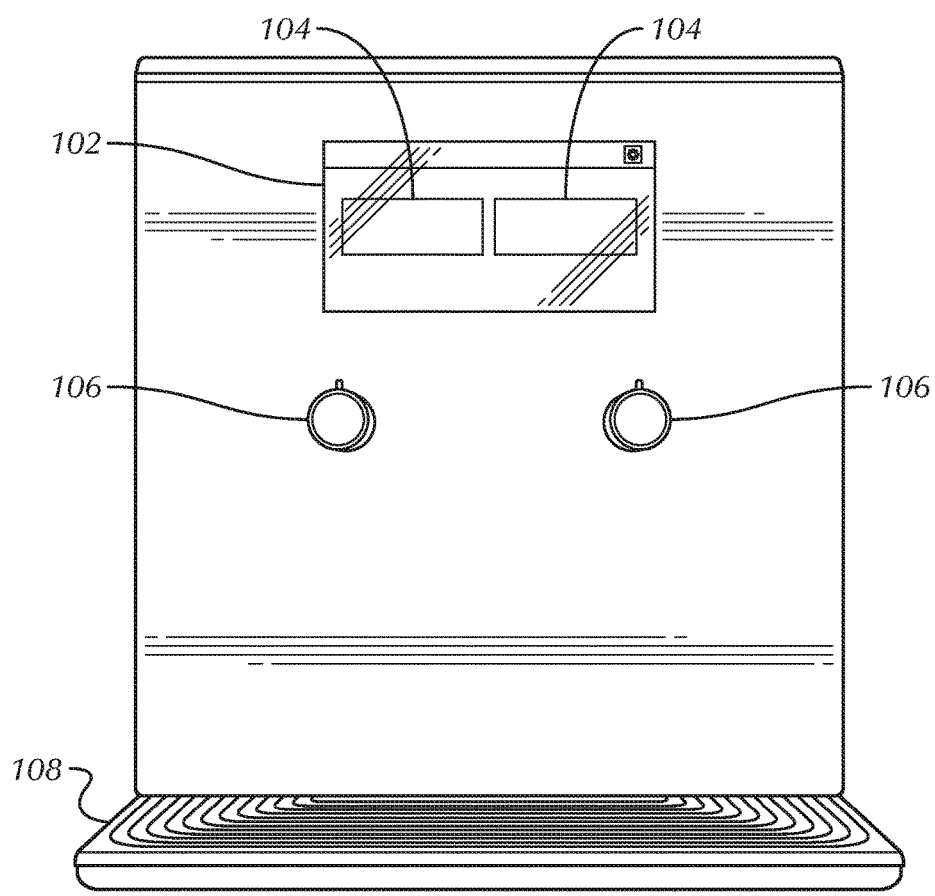
FIGS. 1A-1F depict an exemplary embodiments of systems for preserving, dispensing, and adjusting and maintaining the temperature of a liquid according to various aspects of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Exemplary Wine Processing System

FIGS. 1A-1F depict exemplary embodiments of systems for preserving, dispensing, and adjusting and maintaining the temperature of a liquid, such as wine. Exemplary embodiments may also be used in conjunction with any other desired liquid.

FIG. 1A depicts an exemplary exterior of a system according to various aspects of the disclosure. In this example, system includes a touchscreen 102 displaying one more pouring buttons 104 to control the system, spouts 106 for dispensing the liquid, and a drip tray 108 for capturing the liquid or cleaning solution.

The exemplary system in FIG. 1A may display a variety of information and control options to a user via the touchscreen 102. For example, the system display images of a label from a container of wine or other liquid, enabling a new consumer experience that retains the brand of the winery without physically showing the container (e.g., bottle). The touchscreen 102 may also be configured to allow users to access additional information about a wine or other liquid, such as information about the winery producing a wine, the region the grapes are grown (e.g., Napa Valley), the grape or blend (e.g., Meritage), the year (harvest information), and wine ratings. Alternate embodiments may utilize non-touchscreen displays such as an LCD screen, OLED screen, TFT, and e-Ink in conjunction with user input devices such as a keyboard and/or mouse.

Users can dispense the wine by using the digital serving buttons 104 built into the touchscreen 102, although a mechanical button, shared button, or switch for all bottles where the wine is selected via the touchscreen 102 may also be utilized. The serving buttons 104 may enable a user to select the size of the pour. The wine would then be dispensed via the exterior spout 106, with a dedicated spout 106 for each wine. An alternate embodiment would enable a shared spout for multiple bottles of wine, but a system using dedicated spouts 106 has the advantage of keeping each wine pure.

In the example shown in FIG. 1A, the serving buttons 212 may be configured to dispense a predetermined amount of liquid from a container of liquid. In some embodiments, the amount of liquid dispensed is dependent on the number of times a user presses the serving button 104. For example, the user may push the serving button 104 once for a one ounce tasting pour, twice for a five ounce standard pour, or three times for a large nine ounce pour, although any desired amounts may be dispensed. In other embodiments, the touch screen 102 may include dedicated buttons for each pour size.

In one embodiment, the system uses a single button for each bottle and the button would change color, getting darker each time it's pressed to indicate the pour size. The wine would then be dispensed via the exterior spout 106 for each wine. An alternate embodiment would enable a shared spout for multiple bottles of wine, but this system has the advantage of keeping each wine pure.

The system depicted in FIG. 1A provides several major advantages over existing systems. First, the digital control enables users to interact and learn more about the wine, which is helpful to wineries that want to build their brand. Second, this system allows the user to pour exactly the right amount of wine eliminating human error. For wine tasting rooms, restaurants, bars and other commercial establishments this eliminates a lot of waste, which can account for up to 20% (or more) of their alcohol costs. The manual handheld systems that exist in the market today generally have no measurement capability so the user has no idea exactly how much wine they are pouring. On expensive bottles of wine served by the glass, this can result in significant losses for the restaurant. Further, this system builds on the big trend of people tracking their calories, by enabling people to precisely measure their calorie intake. This system is more intuitive, easier to use and much faster than existing systems.

Figure 1B:
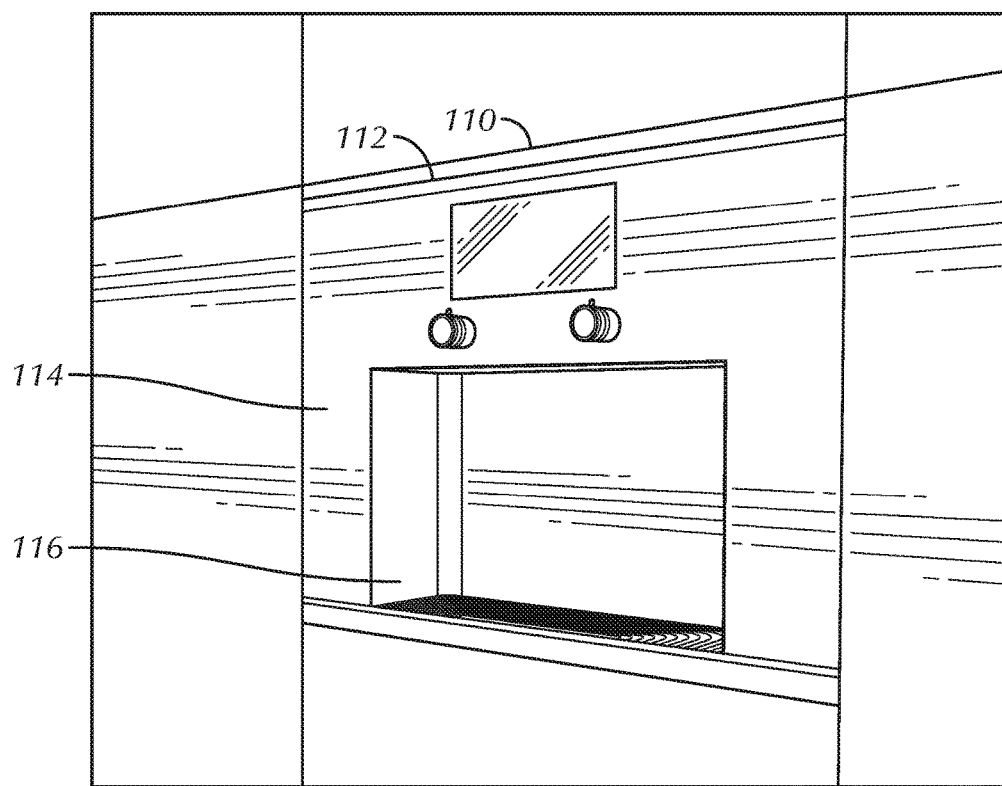

The system shown in FIG. 1A may be incorporated into a variety of other systems and structures. Referring now to FIG. 1B, the system of FIG. 1A is shown as a built-in appliance that may be used with cabinetry and other recessed installations. In this example, the system includes a built-in cabinet casing 114 that has a space frame 110 configured to attach to a cabinet. In some embodiments, the space frame 110 is configured to retrofit the existing appliance without modification to enable the standalone appliance to be used. The system features a recessed glass tray 116 that users can place their glasses on for serving, and allows the drip tray to be integrated without protruding from the machine for a clean look. The system also uses an upward-facing vent 112 that expels hot air from the cooling system in the front since there are no rear vents and upward to avoid blowing directly at the user.

Figure 1C:
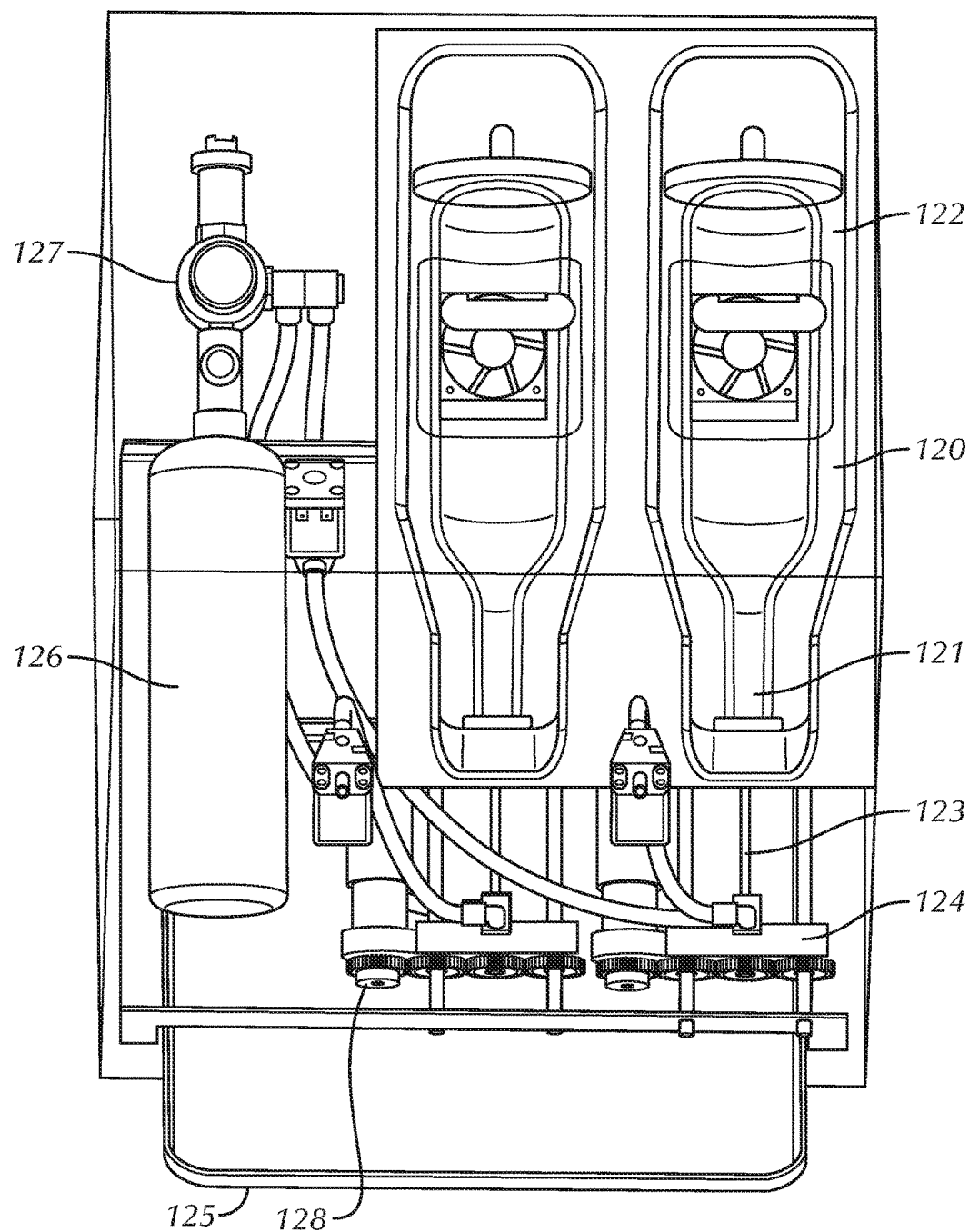
Figure 1D:
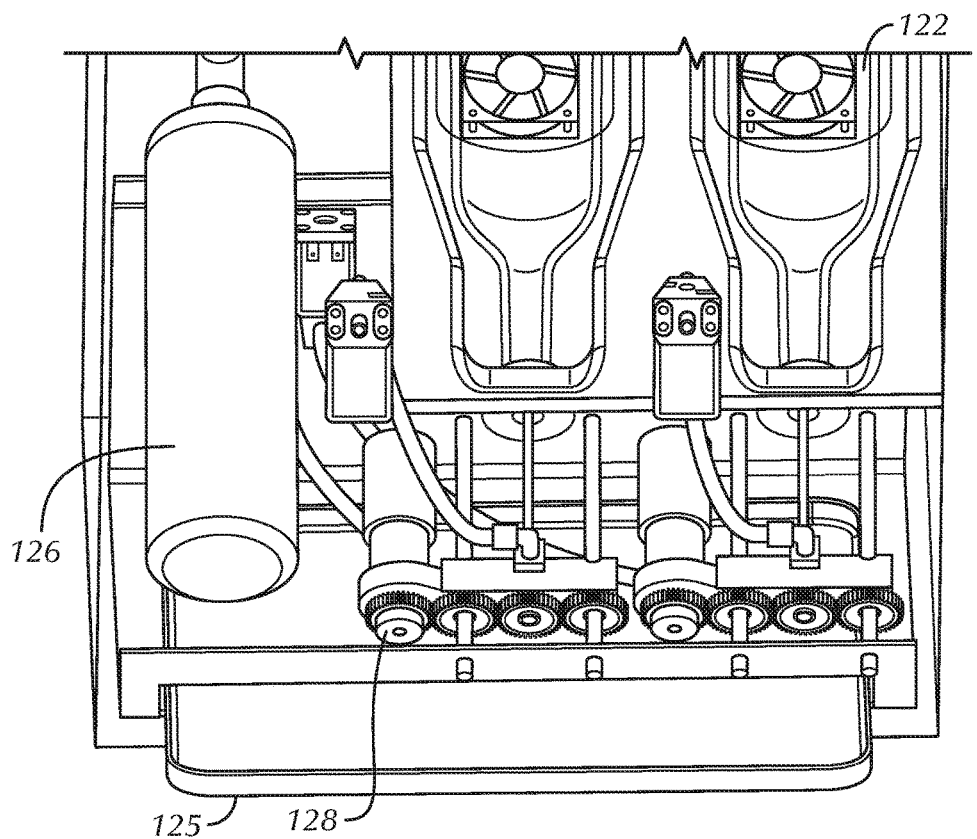

FIG. 1C illustrates an exemplary partial cut-away view of the internal workings of the system depicted in FIG. 1A, while FIG. 1D depicts a close-up view of the system in FIG. 1C. In this example, the system includes a gas source comprising a shared inert gas canister 126 that supplies gas to both enclosures. The gas canister 126 may contain any desired inert gas or combination of inert gasses, including argon, carbon dioxide ($CO_2$), nitrogen, helium, xenon, krypton, and/or neon. The replaceable gas canister 126 may be of any desired size, and preferably is large enough to support filling multiple containers of wine. In one exemplary embodiment, the gas canister 126 is sized to be able to pressurize between about twenty and about one hundred, although alternate embodiments would enable as few as one or two bottles and as many as several hundred bottles. Alternate embodiments may include an inert gas generator (not shown) as an alternative (or in addition) to the inert gas canister 126. The inert gas generator may create inert gas in any suitable manner, such as by performing fractional distillation of air.

The gas canister 126 can be shared between multiple containers of wine or other liquid in the system, enabling multiple wines to be on tap at once. The enclosures in this example are sealable to allow a constant temperature to be maintained within the enclosure, as well as to help prevent injuries from broken glass containers. While the exemplary system in FIG. 1C depicts cylindrical enclosures for holding bottles of wine, alternate embodiments may use enclosures that are configured retain any sort of liquid held in any desired container. In the example shown in FIG. 1C, the wine bottles are inserted upside down into the bottle holders 120. Among other things, this configuration overcomes a disadvantage of previous systems which require humans to manually (and simultaneously) cradle the wine bottle and dispensing system to pour the wine. Additionally, the system in FIG. 1C allows each container of wine to be inserted into its respective cylinder so that the wines can be naturally gravity fed, thereby significantly reducing the amount of pressure required to extract the wine.

The enclosures/cylinders may be configured to increase or decrease in circumference to handle a wide range of wine bottles and secure them so they cannot move. Each cylinder includes a rear bottle holder 122 to cradle the base of the bottle, and the neck of the bottle is also cradled using the bottle neck holder 121 that further helps to secure the bottle from further movement. This configuration is much more stable than alternate systems that only brace the thin neck of the bottle. Further, each enclosure/cylinder protects the user from harm if a bottle (or other container) explodes from the pressure of the inert gas injected into each bottle. Exposure to injury from exploding containers is a problem faced by previous systems.

The bottle (or other container) may be inserted into each enclosure through an opening such as a doorway or other closable portal. The opening may be positioned on the any suitable portion of the enclosure. The opening may be closed via a door or other mechanism to retain the container inside the enclosure. Once the door is closed, the dynamically-adjustable interior portion(s) of the container expand or contract to the perfect circumference to snugly hold the container as described above, and may adjust for any "punt" (i.e., a rounded dimple in the bottom of the bottle).

The gas delivery system in FIG. 1C comprises a needle 123 for piercing a closure in the container (e.g., the cork of a wine bottle) to dispense the liquid from the container and supply the inert gas to the container. The needle 123 may be adapted to pierce a variety of different materials, including cork, engineered cork, plastic, rubber, wood, metal, and combinations thereof. The needle 123 may include at least one passage, such as a gas passage through the needle for supplying the inert gas to the container of liquid and a liquid passage through the needle for dispensing liquid from the container.

In FIG. 1C, the needle 123 is hidden within the appliance and is mechanized, with one end of the needle coupled to a motor and gears 128 adapted to push the needle through the closure. This has several advantages over existing systems. First, using a motorized solution eliminates the need for human intervention making it much simpler and more reliable. Second, this system is much safer than existing systems because the needles 123 are contained within a closed appliance preventing a person from accidentally harming himself or herself with the needle. Third, exemplary embodiments may include a liquid temperature sensor attached to, or embedded in, the needle 123 for monitoring the temperature of the liquid within the container. Alternate embodiments could use a non-motorized version that is still mechanized and allows the needle 123 to be hidden. The needle 123 may be connected to the gas canister 126 via a gas delivery system comprising the quick release needle mechanism 124, which includes a tubing mechanism that allows the gas to be transported from the gas canister 126 to each needle 123 as needed.

As shown in FIG. 1C, the gas delivery system may include a connector (such as quick release mechanism 124) that includes the needle 123 and that can be detached from the rest of the system to allow (for example) easy replacement, repair, and cleaning. Embodiments of the present disclosure further distinguish over previous systems by integrating a cleaning mechanism (not shown). In some embodiments, the cleaning mechanism may include a reservoir for water or another cleaning liquid coupled with a pump for pumping the water or cleaning fluid through the needle 123. The cleaning mechanism may be controlled by a computer system which, among other things, allows the system to automatically clean itself without necessitating human intervention. The system may also include a heating element to heat the water/fluid before pumping it through the system. This is a significant advantage over existing systems that require special chemicals and take 30-60 minutes to clean (often manually). Alternate plumbing configurations could include check valves after the argon solenoids and check valves after the wine solenoids and before the spouts.

The connector may further include (or be coupled to) one or more spouts (such as spouts 106 in FIG. 1A) for dispensing the liquid from one or more containers. The connector may further include a seal adapted to engage with the container to prevent the liquid from leaking from the container. Examples of such a seal are described in more detail below with reference to FIGS. 2A-2L.

The gas in the inert gas container 126 may be pressurized to any desired pressure. In some exemplary embodiments, the inert gas is pressurized at five or more pounds per square inch (PSI). The gas delivery system in the example depicted in FIG. 1C includes a pressure regulator 127 to maintain a consistent pressure within the containers of liquid, while enabling a much higher pressure canister to efficiently power a large number of bottles. When the canister 126 is empty, it can be easily swapped using gas delivery system that includes a lossless gas connection comprising a combination of threading and a rubber seal to prevent gas leaking out of the system.

As shown in FIG. 1C, the two enclosures are adapted to hold bottles of wine, where each bottle has a wider body portion and a narrower neck portion, with a closure in the neck portion of each bottle. The bottles are retained in each enclosure upside down (i.e., with the neck positioned below the body portion. In addition to the advantage of reducing the pressure necessary from the gas delivery system to dispense the liquid from the container, inverting the bottle in the enclosure/cylinder helps reduce the length of tubing required to deliver the inert gas to each container of liquid compared to conventional systems that push tubing all the way to the bottom of the bottle. In such conventional systems, the wine must be forced upward from the bottom which requires more pressure than using the gravity fed method of the present disclosure. Alternate embodiments adapted for other types of containers may likewise position the container as appropriate to take advantage of gravity feeding.

Figure 1E:
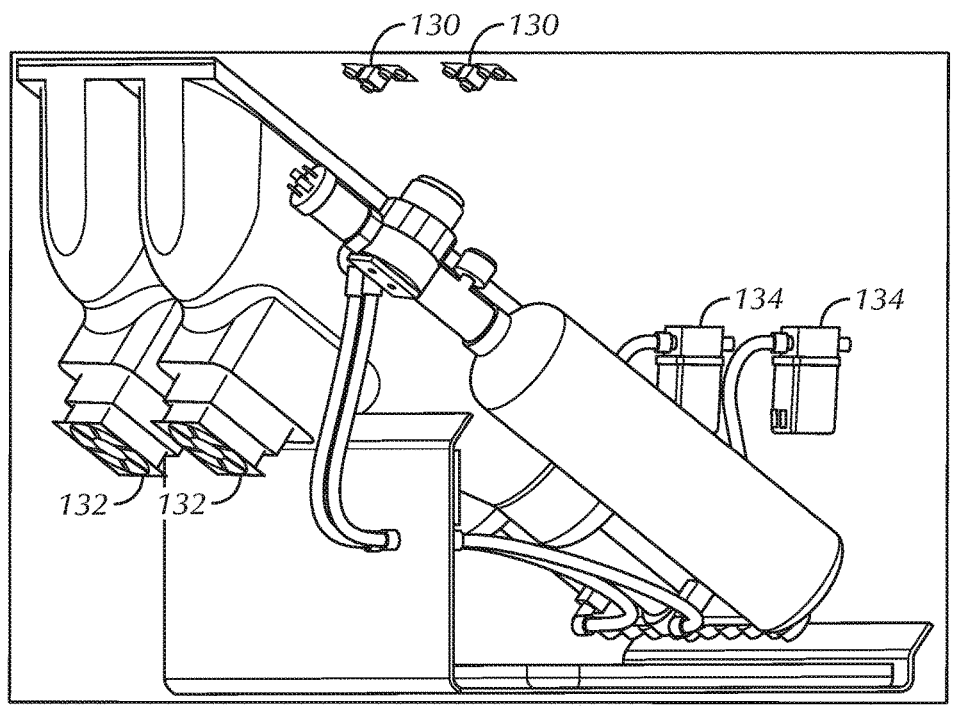

FIG. 1E illustrates a side view of the internal mechanism of the system shown in FIGS. 1A-1D. This view illustrates a pair of cameras 130 capture images of the labels on the containers of liquid received in the enclosures. In this example, the cameras 130 are mounted external to the enclosures holding the containers of liquid, and capture images of the labels through a transparent portion of the enclosure. In alternate embodiments, a single camera could also be shared to capture the labels in multiple enclosures.

The exemplary system in FIG. 1E includes a temperature control system that comprises a pair of thermoelectric cooling units 132 to enable the system to both cool and warm the liquid in the container to the perfect serving temperature. In alternate embodiments, the temperature control system may include a vapor compression refrigeration system coupled to each enclosure. In still other embodiments, the temperature control system may be adapted to use ambient air or a heating element to warm the liquid in the container. Alternate cooling configurations could include a single thermoelectric assembly located centrally with one or more servos operating flaps to direct cooling air to one or both sides at a time as needed.

The temperature control system may include, or be in communication with, one or more temperature sensors. For example, the temperature control system may be in communication with a temperature sensor attached to (or embedded in) the needle 123 to directly monitor the temperature of the liquid in the container. Additionally or alternatively, the temperature control system may include an infrared temperature sensor for measuring the temperature of the exterior of the container and/or a temperature sensor adapted to measure the temperature of the air within the enclosure.

Figure 1F:
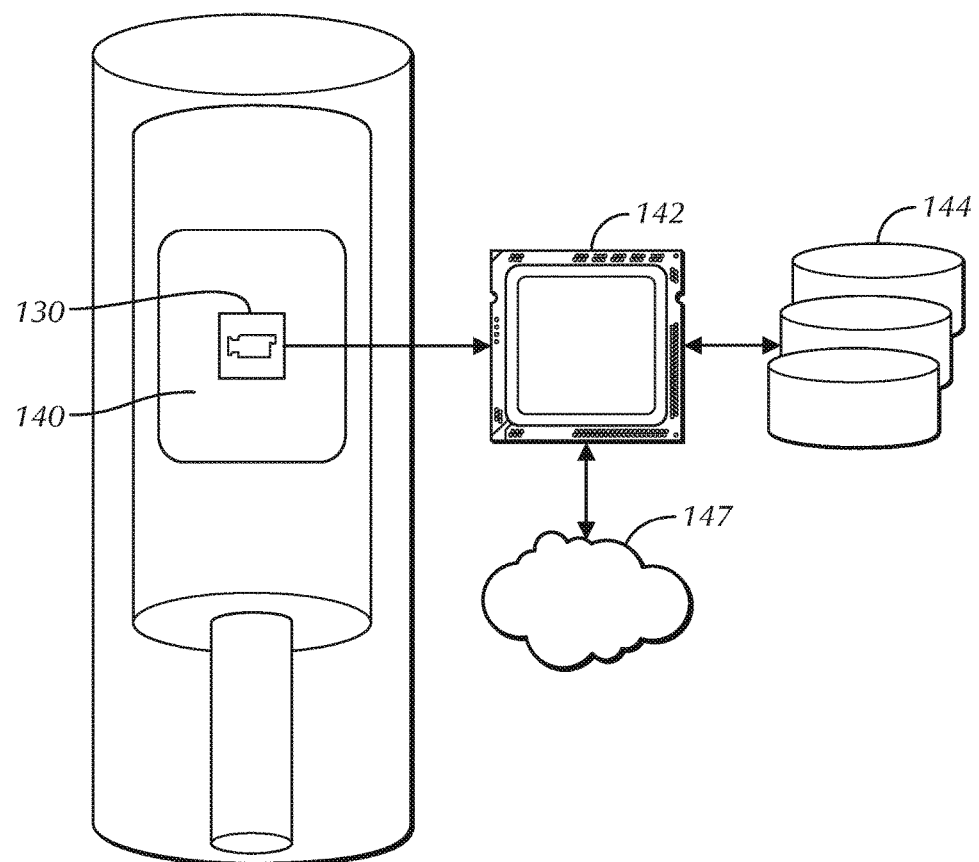

A block diagram of an exemplary embodiment is depicted in FIG. 1F. In this example, a cylindrical enclosure includes multiple securing points to cradle a wine bottle and keep it from moving so a high-quality picture can be captured. The system includes a digital camera 130 disposed within the enclosure to capture images of the wine label(s) 140. As with the other embodiments described herein, the enclosure may be of any size, shape, and configuration and may be adapted to retain any type of container of liquid. The system may include a lighting source (not shown) disposed within the enclosure for illuminating the container and its labeling for the camera 130. In one exemplary embodiment, the lighting source is fixed and adapted to disperse light evenly over the label of a container, even when the label is affixed to a curved surface.

The enclosure may include a mechanism for rotating the bottle (not shown) so the user can simply drop the bottle in to the enclosure without worrying about the placement of the label relative to the camera. The rotating mechanism then rotates the bottle and allows the digital camera 130 within the enclosure to capture images of both the front and rear wine labels. Other alternate embodiments may utilize a cylindrical camera or multiple cameras so that no bottle repositioning is required. Still another alternate embodiment uses indicators on the appliance to let the user know to rotate the bottle so the camera can capture the image. In one embodiment, for example, a first camera may be disposed within the enclosure to capture an image of a front label on a container (e.g., a bottle of wine), while a second camera may be disposed within the enclosure opposite the first camera to capture an image of a rear label of the container.

Computer system 142 is in communication with the digital camera 130 and receives the images of the label(s) on the container of liquid from the camera. The computer system 142 may include a processor, memory, and any other suitable components such as those described for computing devices 310 and 320 in FIG. 3 (see below). The memory may store instructions for programming the computer system to perform various functions when executed by the processor. The computer system 142 may store the image of a label in a memory coupled to the computer system, including various forms of internal read-only and random-access memory, a local database 144, and storage mediums in communication with the computer system 142 via a network, such as the cloud/Internet 147.

The computer system 142 analyzes the image of the label to identify the liquid in the container. In some exemplary embodiments, the computer system may analyze the image using optical character recognition (OCR) and/or image recognition to read the text, identify symbols, and identify other characteristics of the label. The computer system 142 may access a database, such as local database 144, storing information regarding different wines and other liquids in order to identify the liquid in the container based on the information on the label. The computer system may also access one or more remote databases via the cloud/Internet connection 147. The benefit of using a cloud database is that it can be constantly updated, allowing for greater chances of matching the images. Multiple of these components could be combined into a single part performing multiple functions.

The computer system 142 may also be in communication with, and adapted to control one or more functions of, the system's temperature control system and gas delivery system. For example, the computer system 142 may be adapted to control the gas delivery system to supply the inert gas into the container in conjunction with dispensing the liquid from the container. Dispensation of the liquid may be initiated by a user via the touch screen 102 or via another user interface. In some embodiments, dispensing the liquid is predicated upon a user being successfully authenticated to operate the system via an electronic access code. In such cases, the system remains locked and will not dispense a liquid unless and until the user enters the proper electronic access code via the touchscreen 102. Among other things, this allows parents to prevent access to alcoholic beverages by underage children, and hotels and restaurants to provide self-serve beverages to guests and customers by selectively providing access codes. Likewise, physical access to the system (including the enclosures holding the wine or other liquid) may be protected by a lock controlled via the computer system 142.

The computer system 142 may also be programmed to communicate information regarding the dispensing of liquid for the system to a point of sale system to generate an invoice for the dispensed liquid to a customer. Such information may include, an identifier for the customer (e.g, that includes or is based on the electronic access code), the amount of liquid dispensed from the system, an identification of the liquid(s) dispensed, prices of the liquid(s), and other information. Likewise, information regarding the liquid may be transmitted to other computing devices in communication with the computer system 142, such as a wireless device of a user and/or a computing device of a manager of a restaurant. Among other things, this can help customers to easily remember and learn about a wine they sampled from the system. It also helps users of the system monitor the status of the system, including determining when the containers within the enclosures are empty and need to be replaced as well as identifying when the system needs cleaning or repair.

Referring again to FIG. 1A, the computer system 142 may display an image of the label of a container retained within an enclosure on a display screen (such as the touchscreen 102). The image may be the image captured by camera 130, thus giving a visual indicator to users of the system of the contents of the container in each enclosure.

The touchscreen 102 (or other display used in conjunction with embodiments of the present disclosure) may be activated via a proximity sensor that detects the presence of a user near the display. The touchscreen 102 may also (or alternatively) be activated in response to a user touching the touchscreen 102.

In conjunction with identifying the liquid within a container, the computer system 142 may be programmed to determine a serving temperature of the identified liquid and control the temperature control system to adjust and maintain the temperature of the identified liquid at the determined serving temperature. In this manner, different liquids (such as wine) held in different enclosures can be maintained at different respective serving temperatures.

In one exemplary embodiment, control of the temperature control system by the computer system includes: measuring an initial temperature of the liquid contained in an enclosure using a temperature sensor, comparing the initial temperature of the liquid to a desired serving temperature for the liquid, determining a viscosity of the liquid, and estimating the amount of time it will take the temperature control system to adjust the temperature of the liquid to the desired serving temperature based on the initial temperature of the liquid and its viscosity. Embodiments of the present disclosure may, for example, display the time remaining to adjust the temperature of the liquid via the touchscreen 102, or even automatically prevent pouring of the wine from the container until the ideal serving temperature is reached.

Wine Preservation and Dispensing

FIGS. 2A-2L illustrate embodiments of systems for wine preservation according to various aspects of the present disclosure. Although embodiments disclosed herein are described with particular reference to preserving and dispensing wine from bottles, those of skill in the art will recognize that embodiments of the present disclosure may be utilized to preserve and dispense other types of liquids from a wide variety of containers.

The embodiments of the present disclosure provide a variety of advantages and improvements over existing systems. The embodiments described herein help eliminate the need for training of restaurant or winery tasting room personnel in using a specialized device, as some or all of the functionality of the system can be automated. The disclosed embodiments further improve upon existing systems by using a computer to measure the wine exiting the appliance ensuring that there are consistent pours with zero waste or overage. Additionally, the systems disclosed herein may be combined with integrated computerized refrigeration and warming that ensures the wine is automatically served at the perfect serving temperature on demand. The disclosed embodiments can support both small gauge needles that won't harm the cork enabling resealing of bottles, as well as large gauge needles that enable very fast pouring overcoming a limitation of existing non-motorized solutions. This accelerates the serving time from up to twenty-five seconds down to less than five seconds making bartenders, waiters and wine tasting room employees more efficient and their establishments more profitable.

Figure 2A:
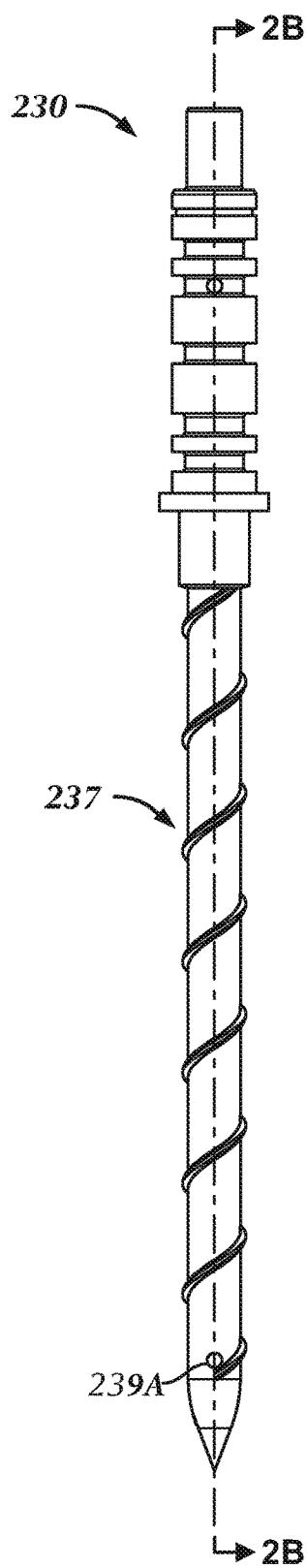
Figure 2B:
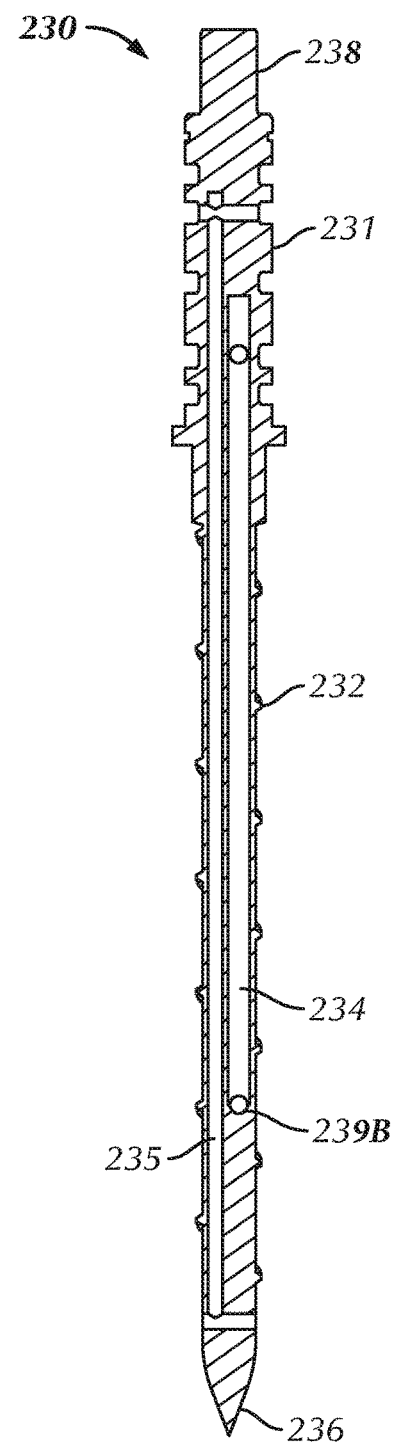
Figure 2C:
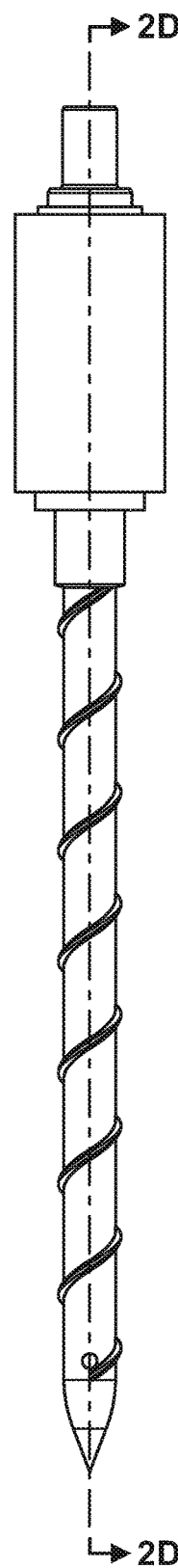
Figure 2D:
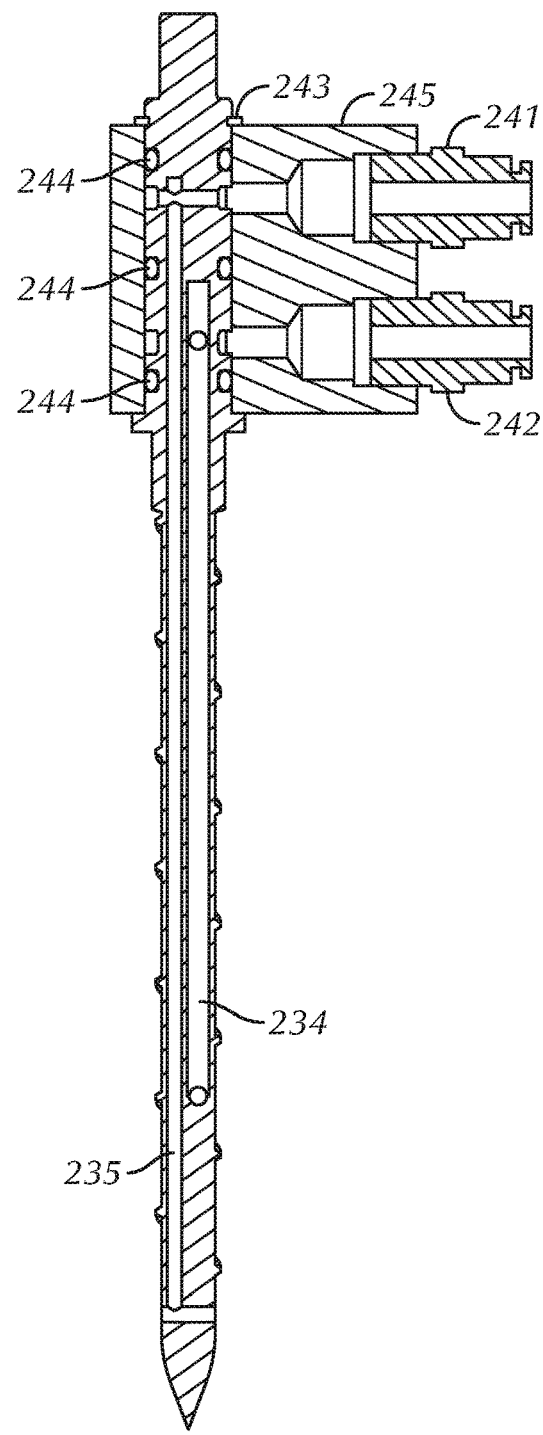
Figure 2G:
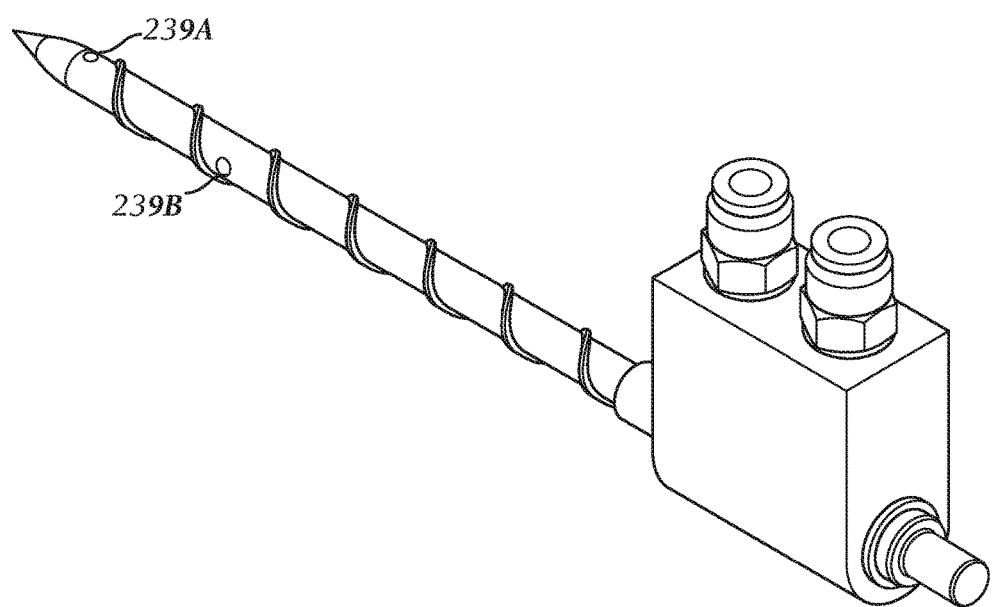

FIGS. 2A-2B illustrate an exemplary embodiment of a needle that may be used in conjunction with embodiments of the present disclosure. This needle 230 overcomes the limitations of many non-coring needles used by conventional systems. The needle 230 has two hollow chambers to enable an inert gas such as argon to be routed (via gas passage 235) disposed along a length 237 of the needle 230 into the wine bottle simultaneously while liquid is extracted from it (via wine passage 234). The gas passage 235, i.e., a gas injection passage, is coupled to the gas source 201, while the wine passage 234, i.e., a liquid extraction passage, is coupled to the spout 206. This enables the system to serve continuous glasses of wine without loss of speed or requiring the user to re-pressurize the bottle 202.

The exterior of needle 230 is at least partially threaded 232. The needle 230 can be mechanically controlled with a motor (via motor connector 238) adapted to push the needle 230 through the closure of the bottle 202 while simultaneously rotating the needle 230 to thread the needle 230 through the closure using the threads 232. Any desired motor may be utilized, including a stepper motor, linear actuator, or other motor.

The pointed tip 236 of the needle 230 helps minimize the force required to insert the needle 230 through the closure/cork of the bottle and to minimize coring to prevent leaks. Further, this design enables the needle 230 to be of a much larger diameter than needle 205 because the threads 232 create a negative force and help reduce the force needed to insert the needle 230. The larger needle, in turn, enables faster pouring speeds.

As with the needle 205, the needle 230 can be mechanically inserted and retracted in a closed assembly, eliminating the risk of human error, harm from a bottle exploding under pressure, or harm from a needle harming the user. Computer-controlling the supply of gas to, and liquid dispensed from, needle 230 also enables precise pour speeds and volumes, enables the measurement of gas consumption, and enables the measurement of liquid dispensed.

The screw mechanism 232 may comprise positive or negative threads (i.e., threads designed for clockwise or counter-clockwise rotation), and such threads may cover some or all of the screw 230. The wine passage 234 and gas passage 235 may be any length, diameter, and configuration. In the example shown in FIG. 2B, the gas passage 235 is longer than the wine passage 234 so that gas injected into the bottle is not sucked into the wine passage, thereby helping to prevent inconsistent pours and splattering.

The gas passage 235 in this example is 0.06" in diameter to achieve the correct flow rate, although alternate diameters or shapes could be used. Once the bottle is pressurized, the wine is extracted from the wine passage 234, which is 0.105" in diameter in this example to enable a flow rate of one ounce per second at 15 psi, although alternate diameters and passage shapes can also be used.

FIGS. 2C-2G illustrate additional features of the needle 230. The needle 230 includes gas fitting 241, i.e., a gas connector, coupled to gas passage 235 that connects to a gas injection opening 239A and a wine tub fitting 242, i.e., a liquid connector, coupled to wine passage 234 that connects to a liquid extraction opening 239B. The gas fitting 241 enables the system to be easily and securely connected to a pressurized gas source 201, while the wine tube fitting 242 enables the system to be connected to an outlet for dispensing the wine, such as spout 206. The snap ring 243 allows the entire mechanism to be easily connected and disconnected from the wine dispensing system for cleaning or replacement in case of damage. Additionally, O-rings 244 help create a tight seal to prevent leaks, although alternate mechanisms could be used to prevent leaks. The casing 245 surrounds the fittings 241, 242 to maintain a clean, food-safe environment.

FIG. 2H illustrates an exemplary embodiment of the drive and guide mechanism 250, i.e., a motion control system. In this example, the motor is connected to a motor drive shaft 251 that uses a spinning mechanism to reduce friction, although a linear actuator or similar straight force could be applied. Alternate embodiments could allow a manual insertion by the user pushing on a plate connected to the drive shaft.

The needle 230 is kept in place by using multiple guide shafts 252, although a single guide shaft could also be used. As the system inserts the needle 230 into the bottle, a seal 253 is attached to the neck portion of the bottle (against the outside of the bottle edge) to prevent liquid from the bottle from leaking from the closure. In this example, the seal 253 is formed from rubber, though any desired alternate material may be used. FIG. 2I shows the system in FIG. 2H after the motor has been successfully actuated to drive the needle 230 through the closure of the bottle.

Figure 2J:
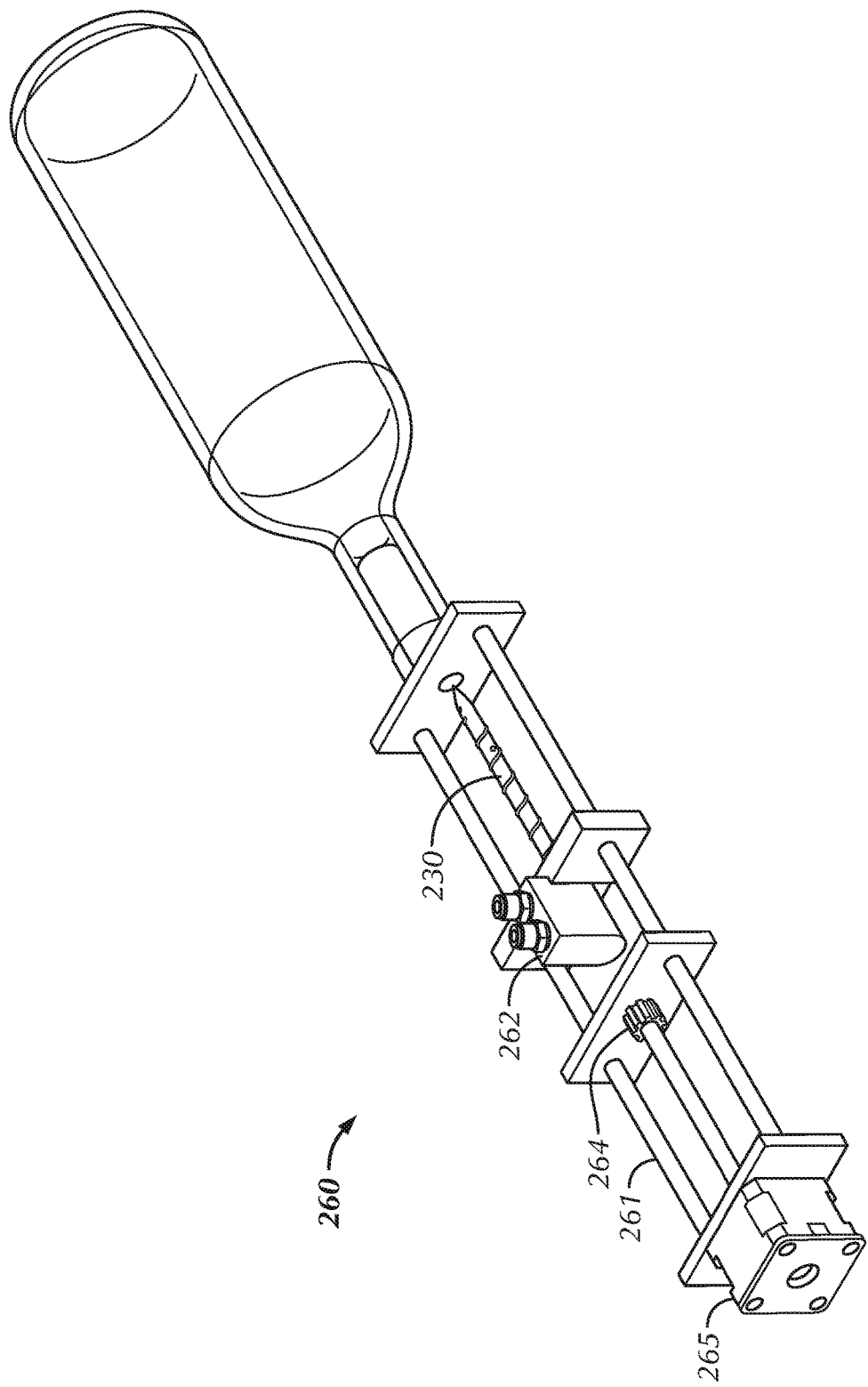
Figure 2K:
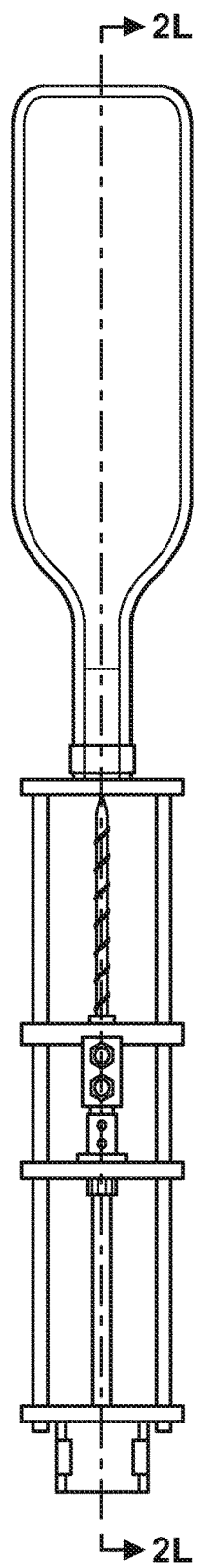
Figure 2L:
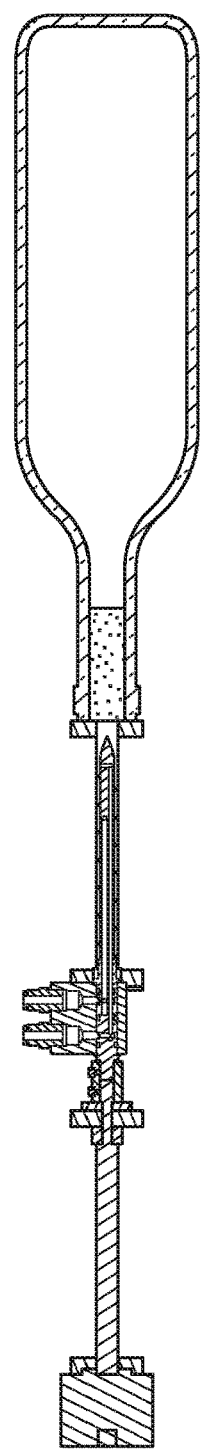

FIGS. 2J-2L show additional views of the mechanism is FIGS. 2H and 2I. In this example, the system uses a stepper motor 265 to insert and extract the needle (labeled "cork screw") 230 from the closure, though other motors or manual approaches could be used. The lead screw 261 connects to the stepper motor 265 to drive the cork screw 230, which is fastened with a lead screw nut 264 to drive a carriage in which a manifold is disposed. The manifold 262 connects the cork screw 230 to the pressurized gas source 201 and the dispensing spout 206 to serve the wine. Finally, the cork screw 1400 can be mechanically inserted and extracted from the cork.

Figure 3:
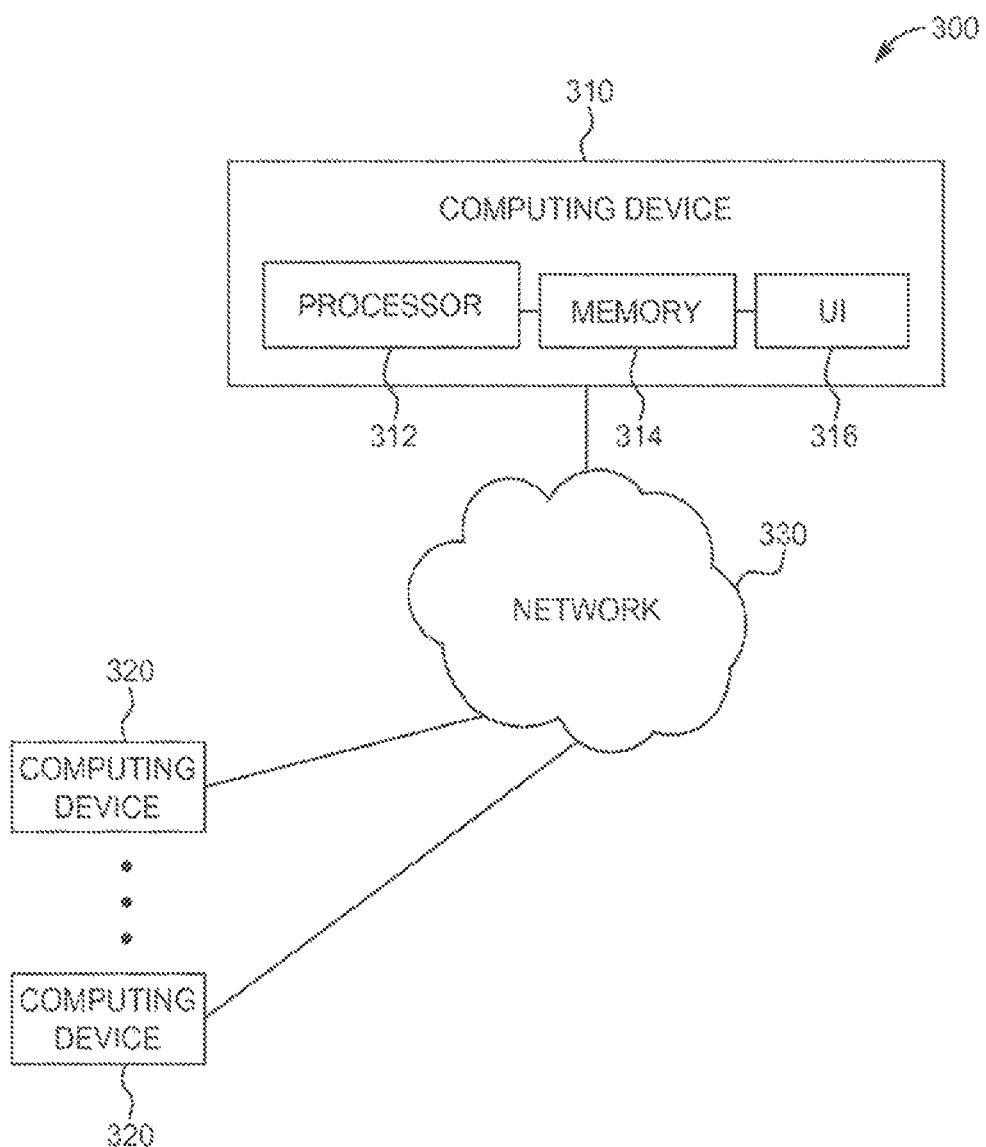
FIG. 3 is a block diagram of an exemplary system according to various aspects of the present disclosure.

System 260 may be coupled to a computing device (such as computing device 310 or 320 in FIG. 3). In such embodiments, the computing device can be programmed to monitor and control the location of the cork screw 230, the volume of liquid that has been extracted, and the volume of gas that has been inserted. This can all be calculated by knowing the pressure of the gas, the initial volume of the bottle, the diameter of the tubes, and the subsequent flow rate. With this system, precise pour sizes can be achieved automatically and without user intervention.

All of these improvements make this an incredibly efficient mechanism for enabling fast and precise dispensing of wine, while enabling long-term preservation, making it ideal for consumers with multiple homes, restaurants, hotel rooms, and a multitude other environments.

FIG. 3 is a block diagram of system which may be used in conjunction with various embodiments. While FIG. 3 illustrates various components of a computer system, it is not intended to represent any particular architecture or manner of interconnecting the components. Other systems that have fewer or more components may also be used.

In FIG. 3, the system 300 includes a computer system 310 comprising a processor 312, memory 314, and user interface 316. Computer system 310 may include any number of different processors, memory components, and user interface components, and may interact with any other desired systems and devices in conjunction with embodiments of the present disclosure.

The functionality of the computer system 310, including the steps of the methods described above (in whole or in part), may be implemented through the processor 312 executing computer-readable instructions stored in the memory 314 of the system 310. The memory 314 may store any computer-readable instructions and data, including software applications, applets, and embedded operating code. Portions of the functionality of the methods described herein may also be performed via software operating on one or more of the user computing devices 320.

The functionality of the system 310 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 312 retrieves and executes instructions stored in the memory 314 to control the operation of the system 310. Any type of processor, such as an integrated circuit microprocessor, microcontroller, and/or digital signal processor (DSP), can be used in conjunction with embodiments of the present disclosure. A memory 314 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 314 in any desired manner, such as in a relational database.

The system 310 includes a user interface 316 that may include any number of input devices (not shown) to receive commands, data, and other suitable input. The user interface 1416 may also include any number of output devices (not shown) to provides the user with data, notifications, and other information. Typical I/O devices may include mice, keyboards, modems, network interfaces, printers, scanners, video cameras and other devices.

The system 310 may communicate with one or more user computing devices 320, as well as other systems and devices in any desired manner, including via network 330. The system 310 and/or user computing devices 320 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 330 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A dispensing device for dispensing a fluid from a container, comprising:
    an enclosure;
    a needle disposed in the enclosure; and
    a motor adapted to:
        move, while the enclosure is closed, the container with respect to the needle while the needle penetrates the container.

2. The dispensing device of claim 1, further comprising:
    a display, disposed outside of the enclosure, adapted to display information associated with the fluid.

3. The dispensing device of claim 2, wherein closing the enclosure obscures the container from view of a user of the dispensing device.

4. The dispensing device of claim 2, further comprising:
    a fluid identifier that identifies a type of the fluid.

5. The dispensing device of claim 4, wherein the fluid identifier comprises a camera.

6. The dispensing device of claim 1, further comprising:
    a temperature regulator adapted to regulate a temperature of the fluid while the container is disposed in the enclosure.

7. The dispensing device of claim 6, wherein the temperature regulator regulates the temperature of the fluid based on a type of the fluid.

8. The dispensing device of claim 6, wherein the dispensing device regulates the temperature of the fluid without user input.

9. The dispensing device of claim 1, further comprising:
    an atmosphere regulator adapted to regulate a composition of an atmosphere within the container after the needle penetrates the container.

10. The dispensing device of claim 9, wherein regulating the composition of the atmosphere comprises injecting a gas into the container.

11. The dispensing device of claim 9, wherein regulating the pressure of the atmosphere within the container comprises raising the pressure of the atmosphere within the container during a dispensing of the fluid.

12. The dispensing device of claim 1, further comprising:
    a storage that stores dispensing information.

13. The dispensing device of claim 12, wherein the dispensing information comprises entries that are associated with a plurality of dispensings of the fluid by the dispensing device, wherein each entry of the entries is associated with a dispensing of the plurality of dispensings.

14. The dispensing device of claim 13, wherein each entry of the entries specifies a type of the fluid dispensed during the associated dispensing.

15. The dispensing device of claim 13, wherein each entry of the entries specifies a cost of the fluid dispensed during the associated dispensing.

16. The dispensing device of claim 13, wherein each entry of the entries specifies a quantity of the fluid dispensed during the associated dispensing.

17. The dispensing device of claim 12, wherein the dispensing device is adapted to send the dispensing information to an external computing device.

18. The dispensing device of claim 1, wherein the container comprises glass, wherein the needle is adapted to penetrate a cork of the container.

\* \* \* \* \*